(12) United States Patent
Tangen

(10) Patent No.: US 7,210,794 B2
(45) Date of Patent: May 1, 2007

(54) OVERLAPPING WAVEFORM UTILIZATION IN PROJECTION SYSTEMS AND PROCESSES

(75) Inventor: Kyrre Tangen, Fredrikstad (NO)

(73) Assignee: Infocus Corporation, Wilsonville, OR (US)

( * ) Notice: Subject to any disclaimer, the term of this patent is extended or adjusted under 35 U.S.C. 154(b) by 61 days.

(21) Appl. No.: 11/129,155

(22) Filed: May 13, 2005

(65) Prior Publication Data

US 2006/0256301 A1 Nov. 16, 2006

(51) Int. Cl.
G03B 21/00 (2006.01)
G03B 21/20 (2006.01)

(52) U.S. Cl. ..................................... 353/85; 353/121

(58) Field of Classification Search .............. 353/30, 353/31, 85, 86, 121; 348/742; 345/213
See application file for complete search history.

(56) References Cited

U.S. PATENT DOCUMENTS

| | | | | |
|---|---|---|---|---|
| 5,537,258 | A | * | 7/1996 | Yamazaki et al. .......... 359/634 |
| 5,654,775 | A | * | 8/1997 | Brennesholtz .............. 348/742 |
| 5,774,196 | A | | 6/1998 | Marshall |
| 6,738,104 | B2 | | 5/2004 | Marshall |
| 7,019,736 | B2 | * | 3/2006 | Allen et al. ................. 345/207 |
| 7,038,284 | B2 | | 5/2006 | Haukka |
| 7,046,221 | B1 | * | 5/2006 | Malzbender ................. 345/82 |
| 7,083,284 | B2 | * | 8/2006 | Peterson et al. ............. 353/31 |

* cited by examiner

*Primary Examiner*—Rodney Fuller
(74) *Attorney, Agent, or Firm*—Schwabe Williamson & Wyatt

(57) ABSTRACT

Projection systems and processes for generating and utilizing overlapping waveforms are disclosed herein. The overlapping waveforms may be output waveforms generated by a plurality of single color light sources.

21 Claims, 3 Drawing Sheets

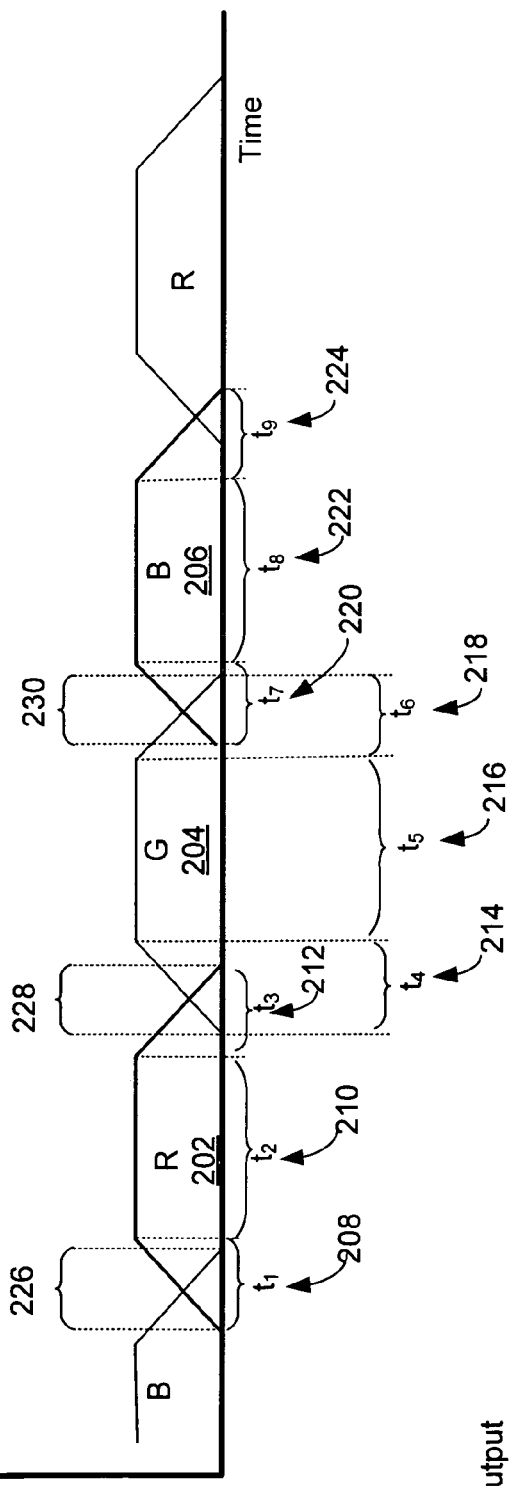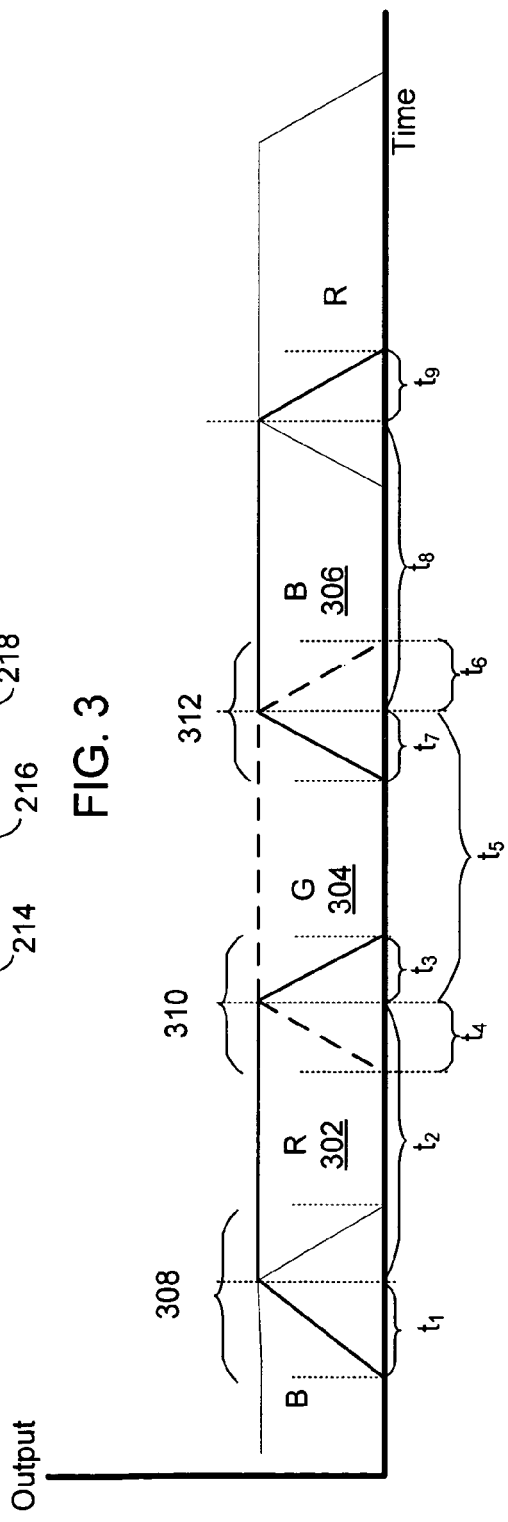

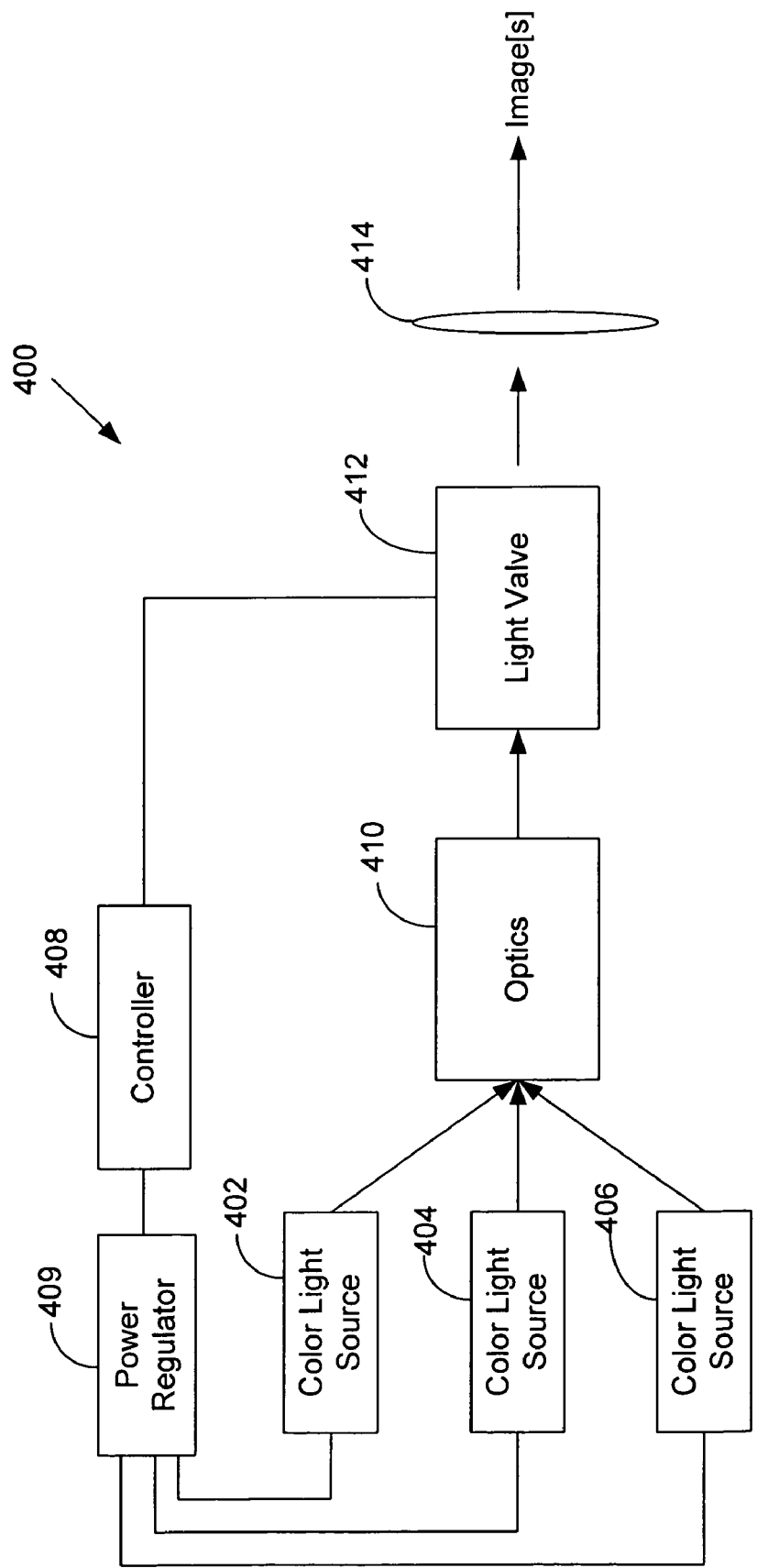

OVERLAPPING WAVEFORM UTILIZATION IN PROJECTION SYSTEMS AND PROCESSES

FIELD OF THE INVENTION

Embodiments of the invention relate generally to the field of projection systems, and more particularly to projection systems with multiple single color light sources.

BACKGROUND OF THE INVENTION

Projection systems of various designs have been around for many years including projection systems called field sequential projection systems. In a field sequential projection system, single color lights are sequentially generated and projected through a spatial light modulator, such as a light valve, in order to generate a plurality of single color images. The color lights that are initially generated are single color lights typically associated with the primary colors of red, green, and blue. The single color images that are generated by the light valve, when projected onto a screen, may combine to form full-color images.

These field sequential projection systems can be categorized into at least two groups of field sequential projection systems, those that employ a single polychromatic light source such as those projection systems that employ color wheels and arc lamps, and those that employ multiple single color or monochromatic light sources. Examples of the second group include projection systems that employ light-emitting diodes (LEDs) to generate the different color lights.

When multiple single color light sources are employed in a field sequential projection system, each of the individual single color light sources are typically energized and de-energized sequentially. For example, if the single color light sources are used to generate the primary colors of red, green, and blue, each of the single color light sources will be sequentially energized and de-energized during nonoverlapping time periods. FIG. 1A depicts the ideal output waveforms generated by three single color light sources that generate the three primary colors of red (R), green (G), and blue (B). As depicted, in the ideal case, the output waveforms generated by each of the single color light sources will have instantaneous rise and fall times. Further, in such an ideal scenario, as soon as one light source is shut off, a second light source will be instantaneously turned on.

Unfortunately, output waveforms generated by single color light sources of conventional field sequential projection systems will not look like the output waveforms depicted in FIG. 1A but may instead have the output waveforms as depicted in FIG. 1B. The depicted output waveforms having gradual rise and fall times, which result in dead times between the output waveforms. The dead times between the output waveforms will mean that there will be a loss of lumens from the image or images that are projected onto the display screen.

BRIEF DESCRIPTION OF THE DRAWINGS

Embodiments of the invention are illustrated by way of example and not by way of limitation in the figures of the accompanying drawings, in which like references indicate similar elements and in which:

FIG. 2 illustrates output waveforms of a projection system that employs multiple color light sources in accordance with some embodiments;

FIG. 3 illustrates output waveforms of a projection system that employs multiple color light sources in accordance with some embodiments; and FIG. 4 is a block diagram of an example projection system that employs multiple color light sources in accordance with some embodiments.

DETAILED DESCRIPTION

Figure 1A:
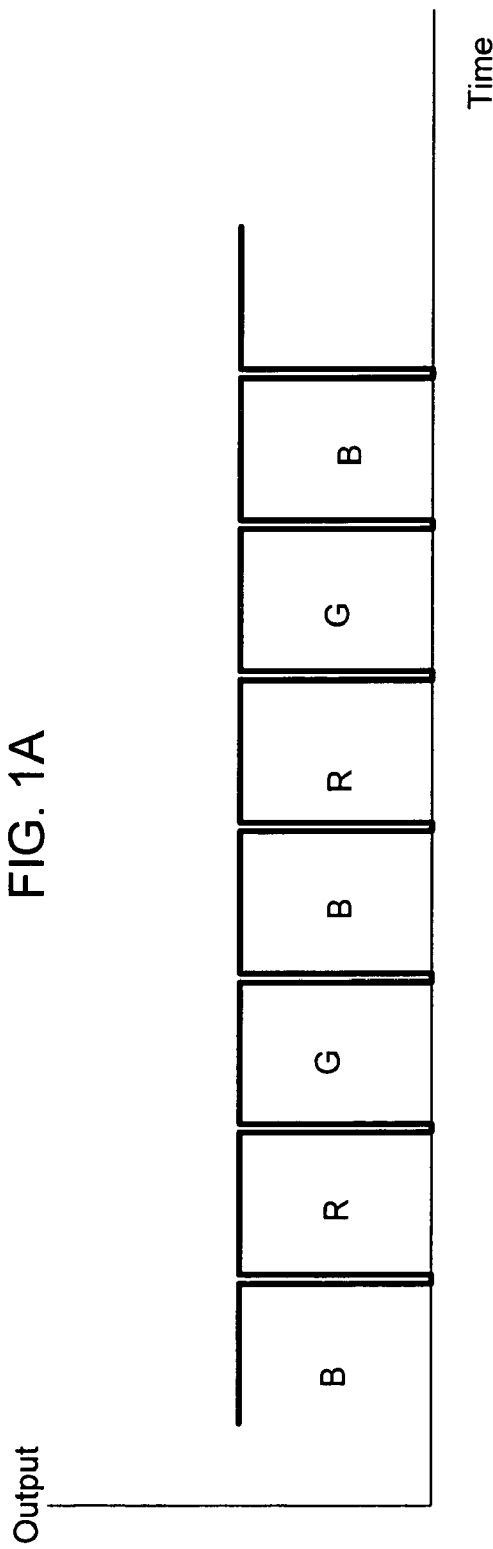
FIG. 1A illustrates the ideal output waveforms of a field sequential projection system that employs multiple single color light sources.
Figure 1B:
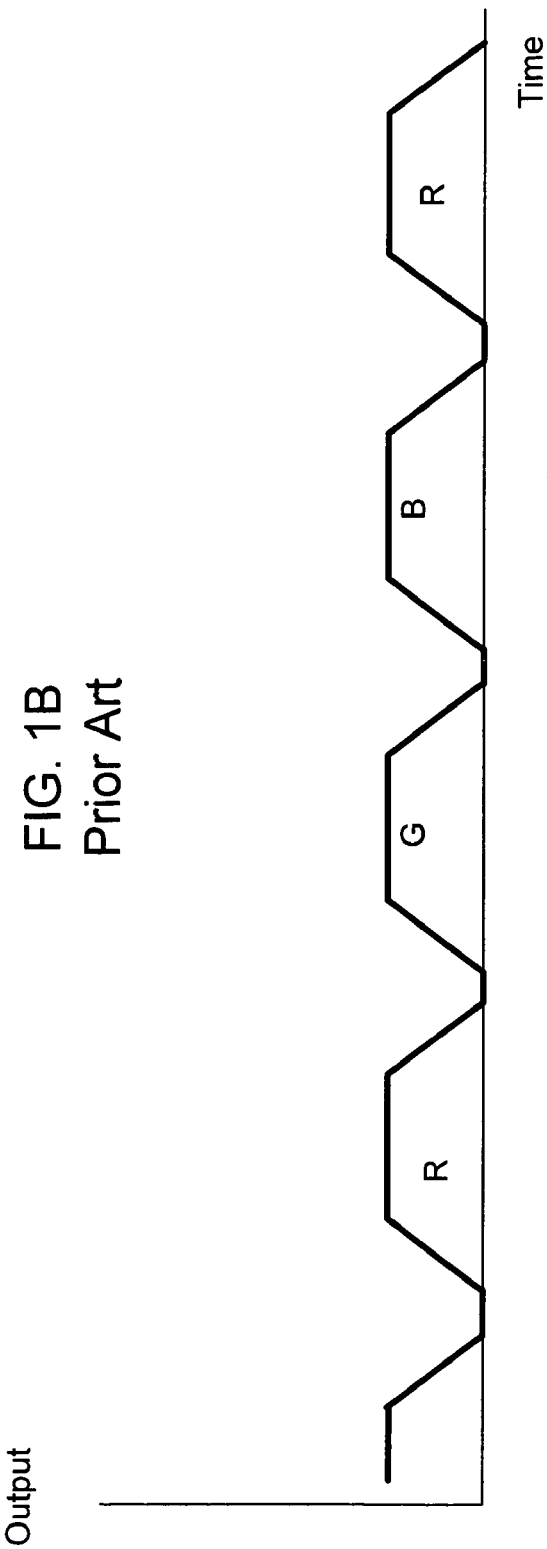
FIG. 1B illustrates the output waveforms of a conventional field sequential projection system that employs multiple single color light sources.

Illustrative embodiments of the present invention include projection systems and processes for generating and utilizing overlapping output waveforms produced by multiple single color light sources.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

According to various embodiments of the invention, projection systems and processes that reduce or completely eliminate the dead time between sequential output waveforms generated by a plurality of color light sources are described herein. In some embodiments, this may be accomplished by overlapping the output waveforms. For the embodiments, the output waveforms are the outputs of single color light sources (herein "color light sources"). The color light sources, in some embodiments, may each generate single color lights associated with the primary colors of red, green, and blue. In other embodiments, however, the color light sources may generate other color lights other than those associated with the primary colors. In various embodiments, the color light sources may be monochromatic light sources such as light-emitting diodes (LEDs). The overlapping portions of the output waveforms may be utilized to contribute to generating one or more images on a display screen.

FIG. 2 depicts overlapping output waveforms from three color light sources of a projection system in accordance with some embodiments. For the embodiments, the overlapping output waveforms may be used to generate one or more single color images, which in turn, may be used to generate one or more full color images on a display screen. The output waveforms are generated when the three color light sources are energized and de-energized in a sequentially overlapping manner. In this illustration, the color lights generated by the color light sources may be the primary colors of red (R), green (G), and blue (B). Note again that in other embodiments, the color lights generated by the three color light sources may be other color lights other than those that are associated with the primary colors.

For the embodiments, a plurality of output waveforms 202 to 206 are generated, each of the output waveforms 202 to 206 being generated by the three different color light sources. Each of the output waveforms 202 to 206 may include a rising portion, a flat portion, and a declining portion. The rising portion corresponds to the light output of a color light source being incrementally increased as a result of energizing the corresponding color light source. Note that the rising portions of the waveforms can also have deliberate waveforms. That is, there may be situations where having such control over the different portions of a waveform may be advantageous. Thus, different portions of a waveform (as well as the waveform itself) may be made to have a variety of shapes and sizes depending upon the circumstances. The flat portion represents the light output of the color light source at steady state as a result of the corresponding color light source being fully energized. The declining portion represents the light output of the corresponding color light source being decrementally decreased as a result of de-energizing the color light source.

The three portions of an output waveform may be associated with specific time increments. For example, when a first color light source, such as a red color light source, is being energized to begin forming a first output waveform 202, the first color light source will incrementally increase its light output during a first increment of time ($t_1$) 208 until the first color light source reaches steady state. As a result of the first color light source being fully energized, during a second increment of time ($t_2$) 210 the light output of the first color light source is at steady state. During a third increment of time ($t_3$) 212, the first color light source is de-energized and the light output of the first color light source decrementally decreases until the light output of the first light source reaches zero.

In various embodiments, while the first color light source (e.g., red light) is being de-energized and still generating a light output, a second light source (e.g., green light) is energized to begin generating a second waveform 204. Similar to the first output waveform 202, the second output waveform 204 may have three portions, a rising portion, a flat portion, and a declining portion. The three portions of the second output waveform 204, like the three portions of the first output waveform 202, will be associated with three time increments ($t_4$, $t_5$ and $t_6$) 214 to 218. The second light source is energized to incrementally increase its light output from zero to steady state during a fourth time increment ($t_4$) 214. The fourth time increment ($t_4$) 214 for the second color light source overlaps, at least in part, the third time increment ($t_3$) 212 of the first light source. During a fifth time increment ($t_5$) 216, the second color light source generates a light output at steady state. At the end of the fifth time increment ($t_5$) 216, the second color light source is de-energized resulting in the decremental decrease in the light output of the second color light source during a sixth time increment ($t_6$) 218 until the light output drops to zero output.

In various embodiments, while the second color light source is being de-energized and still generating a light output, a third color light source (e.g., blue light) is energized to generate a third waveform 206. Similar to the first and second output waveforms 202 and 204, the third output waveform 206 may have three portions, a rising portion, a flat portion, and a declining portion. The three portions of the third output waveform 206, like the three portions of the first and second output waveforms 202 and 204, will be associated with three time increments ($t_7$, $t_8$, and $t_9$) 220 to 224. The third color light source is energized to incrementally increase its light output from zero to steady state during a seventh time increment ($t_7$) 220. The seventh time increment ($t_7$) 220 for the third color light source overlaps, at least in part, the sixth time increment ($t_6$) 218 of the second color light source. During an eighth time increment ($t_8$) 222, the third color light source generates light output at steady state. At the end of the eighth time increment ($t_8$) 222, the third color light source is de-energized resulting in the decremental decrease in the light output of the third color light source during a ninth time increment ($t_9$) 224 until the light output drops to zero output.

In various embodiments, before the light output of the third color light source drops to zero output at the end of the ninth time increment ($t_9$) 224, the first color light source is re-energized to incrementally increase its light output. This begins again the cycle of energizing and de-energizing of the three color light sources described above. Note that although the above description describes the output waveforms 202 to 206 as including three portions (e.g., rising, flat, and declining portions), in other embodiments, the output waveforms may include only two portions, a rising and a declining portion. Thus, each of the output waveforms may be associated with only two time increments. For example, in the above description, the time increments ($t_2$, $t_5$, and $t_8$) associated with the flat portions of the output waveforms 202 to 206 may not be present in such embodiments.

In various embodiments, the overlapping portions of the output waveforms 202 to 206 may form transition lights during transition periods 226 to 230. During each of the transition periods 226 to 230, at least two different color lights from two color light sources may be simultaneously generated. The at least two different color lights form a combined transition light that may be used to at least contribute to generating one or more full color images on a screen. In FIG. 2, the overlapping portions of the waveforms may result in at least three different transition lights being generated. The transition lights may be utilized using, for example, a spoke recovery algorithm used in color wheel field sequential projection systems. Using such an algorithm, the transition lights generated during the transition periods 226 to 230 may be used to generate white light or secondary color lights that are combinations of two of the three primary color lights (e.g., red, green, and blue). These lights may be particularly useful in the formation of full color images if, for example, the full color image or images to be generated requires such color lights (e.g., white light or secondary color lights).

FIG. 3 depicts overlapping output waveforms generated from three color light sources of a projection system in accordance with some embodiments. The output waveforms 302 to 306 (note that waveform 304 is indicated by a skipping line and waveforms 302 and 306 are indicated by solid lines) are generated when the three color light sources are energized and de-energized in a sequentially overlapping manner. Similar to the output waveforms depicted in FIG. 2, the output waveforms 302 to 306 each are also made up of three portions, a rising portion, a flat portion, and a declining portion. However, unlike the output waveforms 202 to 206 depicted in FIG. 2, in this case, the declining portion of one waveform (e.g., waveform 302) is completely overlapped by the rising portion of a second waveform (e.g., waveform 304). In other words, for example, the third time increment ($t_3$) associated with the declining portion of the first waveform 302 comes after the fourth time increment ($t_4$) associated with the rising portion of the second waveform 304. Similarly, the sixth time increment ($t_6$) associated with the declining portion of the second waveform 304 comes after the seventh time increment ($t_7$) associated with the rising portion of the third waveform 306. This means that the second color light source is energized while the first color light source is still fully energized (e.g., steady state) and the first color light source is beginning to de-energized. Similarly, the third color light source may be energized while the second color light source is still fully energized (e.g., steady state) and the second color light source is beginning to de-energized. As a result, the transition periods 308 to 312, as defined by the overlapping portions of the output waveforms 302 to 306, may be larger than the transition periods 226 and 230 depicted in FIG. 2 for similar size output waveforms (i.e., waveforms 302 to 306 having the same size as the waveforms 202 to 206 of FIG. 2).

FIG. 4 depicts a projection system with multiple color light sources in accordance with some embodiments. For the embodiments, the projection system 400 may be a field sequential projection system that includes a plurality of color light sources 402 to 406. The projection system 400 may further include a controller 408, a power regulator 409, optics 410, a light valve 412, and projection lens 414. In brief, the projection system 400 may generate one or more single color images that may be projected onto a display screen (not depicted). The one or more single color images, when combined on the display screen, may produce full color images that are composites of the single colored images that are projected onto the display screen.

The plurality of color light sources 402 to 406 may each generate a light of different colors such as the primary colors of red, green, and blue. In other embodiments, however, the color lights generated by the color light sources 402 to 406 may be other color lights other than lights associated with the primary colors. In various embodiments, the light sources 402 to 406 may be light-emitting diodes (LEDs). Although three color light sources 402 to 406 are depicted in FIG. 4, in other embodiments, more or less than three color light sources may be employed in the projection system 400.

The controller 408 may be adapted to control the operations of the light sources 402 to 406 in an overlapping sequential manner such as described previously. This may be accomplished, for example, by controlling the power being supplied to the light sources 402 to 406 via the power regulator 409 in a sequential overlapping manner so that the light outputs (e.g., output waveforms) generated by the color light sources 402 to 406 overlaps. Power regulator 409 receives power from a power source (not shown).

The controller 408, in various embodiments, may be further adapted to control the operations of the light valve 412. The controller 408 may include a microprocessor that may receive color image data from a multimedia device such as a personal computer (PC), digital video disc (DVD) player, video cassette recorder (VCR), or other multimedia devices. The color image data received by the microprocessor may be converted to a plurality of single color image frame data, which may be conveyed to the light valve 412. The controller 408 may control the light valve 412 so that the light valve 412 operates in synchronism with the operation of the color light sources 402 to 406. In alternate embodiments, separate coordinated controllers may be employed instead.

The optics 410 may be used to direct and/or shape the color lights generated by the color light sources 402 to 406 to the light valve 412. The optics 410, in various embodiments, may include a variety of optical components such as lenses, fiber optics, prisms, integrating tunnels, x-cubes, beam combiner, and/or other optical components.

The light valve 412 may be employed as a spatial light modulator used to modulate the single color lights generated by the color light sources 402 to 406. The modulation of the single color lights may be performed in order to sequentially generate single color images that are projected onto a display screen via the projection lens 414. The single color images, when projected onto the display screen, may combine to form one or more full color images. In various embodiments, the light valve 412 may be a digital micromirror device (DMD), a liquid crystal on silicon (LCOS) device, a digital light processing (DLP) device, a liquid crystal device (LCD), or other modulating device. Note that although the projection lens 414 is depicted as being a single lens, the projection lens 414 may actually be comprised of a plurality of lenses.

Operationally, the projection system 400 may generate one or more full color images on a display screen by initially receiving image signals from an image source such as a personal computer, digital video device (DVD), video cassette recorder (VCR), or other multimedia devices. The controller 408, based in part on the received image signals, may be adapted to control the color light sources 402 to 406 by sequentially energizing and de-energizing the color light sources 402 to 406 in a manner that overlaps the light outputs of the color light sources 402 to 406 as described previously. The color lights generated by the color light sources 402 to 406 may be projected through the optics 410 and to the light valve 412. In various embodiments, the color lights that are projected through the 410 may include transition lights that are generated during transition periods. The controller 408 may then control the light valve 412 so that the light valve 412 may selectively modulate the color lights received from the color light sources 402 to 406. The light valve 412 may be operated in synchronism with the operation of the color light sources 402 to 406. The modulated color lights may form one or more single color images that are then projected sequentially onto a display screen via the projection lens 414 forming one or more full color images.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the embodiments of the present invention. Therefore, it is manifestly intended that embodiments of this invention be limited only by the claims.

What is claimed is:

1. In a projection system, a method of operation, comprising:
    energizing a first color light source to generate a first color light during a first increment of time;
    de-energizing the first color light source for a second increment of time, the de-energizing decrementally reducing the light output of the first color light source; and
    energizing a second color light source to generate a second color light during a third increment of time that overlaps with the second increment of time at least in part, the energizing incrementally increasing the light output of the second color light source.

2. The method of claim 1, wherein said energizing a first color light source comprises energizing a first primary color light source, and said energizing a second color light source comprises energizing a second primary color light source that is different from said first primary color light source.

3. The method of claim 1, wherein the first and second color lights generated during de-energizing of the first color light source forms a first transition light, and the method further comprises employing the first transition light to at least contribute to generating an image on a screen.

4. The method of claim 1, wherein said energizing of the first and the second color light sources comprises energizing a first and a second light-emitting diodes (LEDs), respectively.

5. The method of claim 1, wherein said energizing a second color light source comprises energizing the second color light source while the first color light source is still energized.

6. The method of claim 1 further comprising de-energizing the second color light source during a fourth increment in time, and energizing a third color light source to generate a third color light during a fifth increment in time that overlaps with the fourth increment in time at least in part.

7. The method of claim 6, wherein said energizing the first, the second, and the third light sources comprises energizing a first, a second, and a third primary color light sources respectively.

8. The method of claim 7, wherein the first and second color lights generated during de-energizing of the first color light source forms a first transition light, the second and third color lights generated during the de-energizing of the second color light source forms a second transition light, and the method further comprises employing the first and second transition light to at least contribute to generating an image on a screen.

9. The method of claim 8 further comprising de-energizing the third color light source during a sixth increment in time, and energizing the first color light source to generate the first color light during a seventh increment in time that overlaps the sixth increment in time at least in part.

10. The method of claim 9, wherein the third and first color lights generated during de-energizing of the third color light source forms a third transition light, and the method further comprises employing the third transition light to at least contribute to generating an image on a screen.

11. In a projection system, a method of operation, comprising:
generating a first and a second color lights simultaneously during a first time period, from a first and a second color light source, respectively, the first and the second color lights combining to form a first transition light, the first color light being de-energized during the first time period, and the second color light being energized during the time period, the energizing incrementally increasing the light output of the second color light source; and
employing the first transition light to at least contribute to generating an image on a screen.

12. The method of claim 11, wherein said generating comprises generating a first and a second primary color lights.

13. The method of claim 11, wherein said generating comprises generating the first and the second color lights from light-emitting diodes (LEDs).

14. The method of claim 11 further comprising generating third and fourth color lights simultaneously during a second time period, from the second color light source and a third color light source, respectively, the third and the fourth color lights combining to form a second transition light, the third color light being de-energized during the second time period, and the fourth color light being energized during the second time period and employing the second transition light to at least contribute to generating the image on the screen.

15. The method of claim 14 further comprising generating fifth and sixth color lights simultaneously during a third time period, from the third and the first color light sources, respectively, the fifth and sixth color lights combined to form a third transition light, the fifth color light being de-energized during the third time period, and the sixth color light being energized during the time period, and employing the third transition light to at least contribute to generating the image on the screen.

16. An apparatus, comprising:
a plurality of color light sources; and
a controller coupled to the plurality of color light sources, the controller adapted to energize a first of the plurality of color light sources to generate a first color light for a first increment in time; de-energizing the first of the plurality of color light sources for a second increment in time, the de-energizing to reduce the light output of the first of the plurality of color light sources to zero light output at the end of the second increment in time, and energizing a second of the plurality of color light sources to generate a second color light for a third increment in time that overlaps with the second increment in time at least in part, the energizing incrementally increasing the light output of the second color light source.

17. The apparatus of claim 16, wherein the color light sources comprise light-emitting diodes (LEDs).

18. The apparatus of claim 16, wherein the color light sources comprise monochromatic color light sources, each of the monochromatic color light sources to generate a different primary color.

19. The apparatus of claim 16, further comprising a light valve, the light valve adapted to modulate color lights generated by the plurality of color light sources.

20. The apparatus of claim 19, wherein the controller adapted to control the light valve is synchronous with operation of the plurality of color light sources.

21. The apparatus of claim 20, wherein said light valve adapted to modulate one or more transition lights generated by the plurality of color light sources.

* * * * *